Dec. 12, 1939.  G. M. DEMING  2,182,796
WELDING PROCESS
Filed Jan. 20, 1936  2 Sheets-Sheet 2
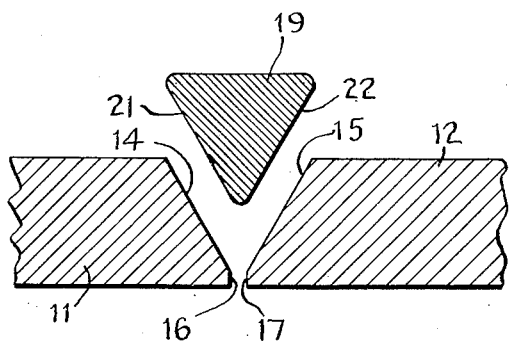
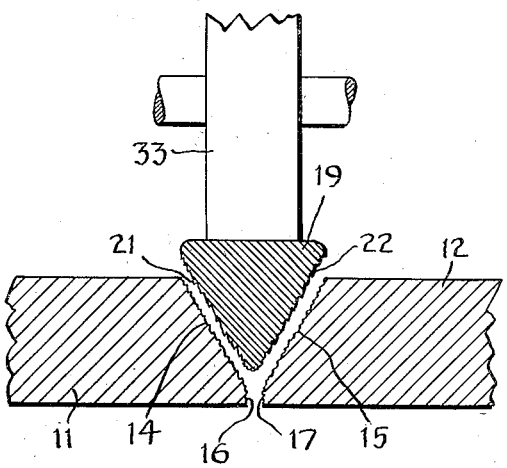
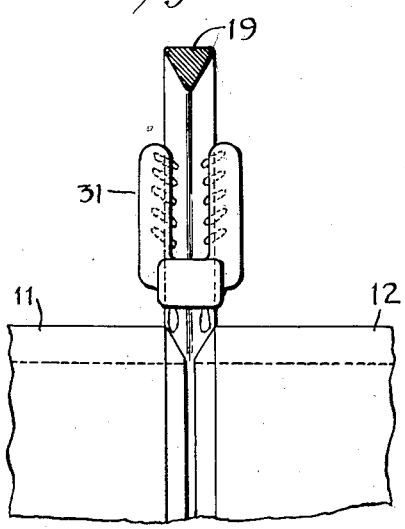
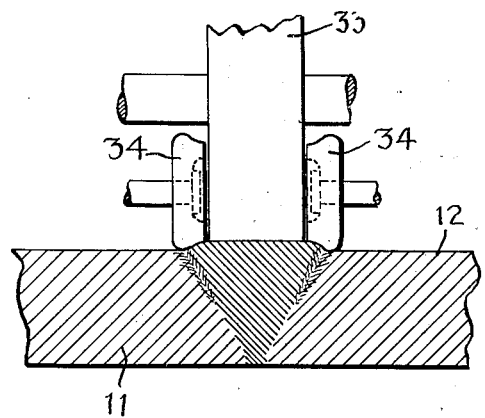
INVENTOR
George M. Deming
BY
ATTORNEY Patented Dec. 12, 1939

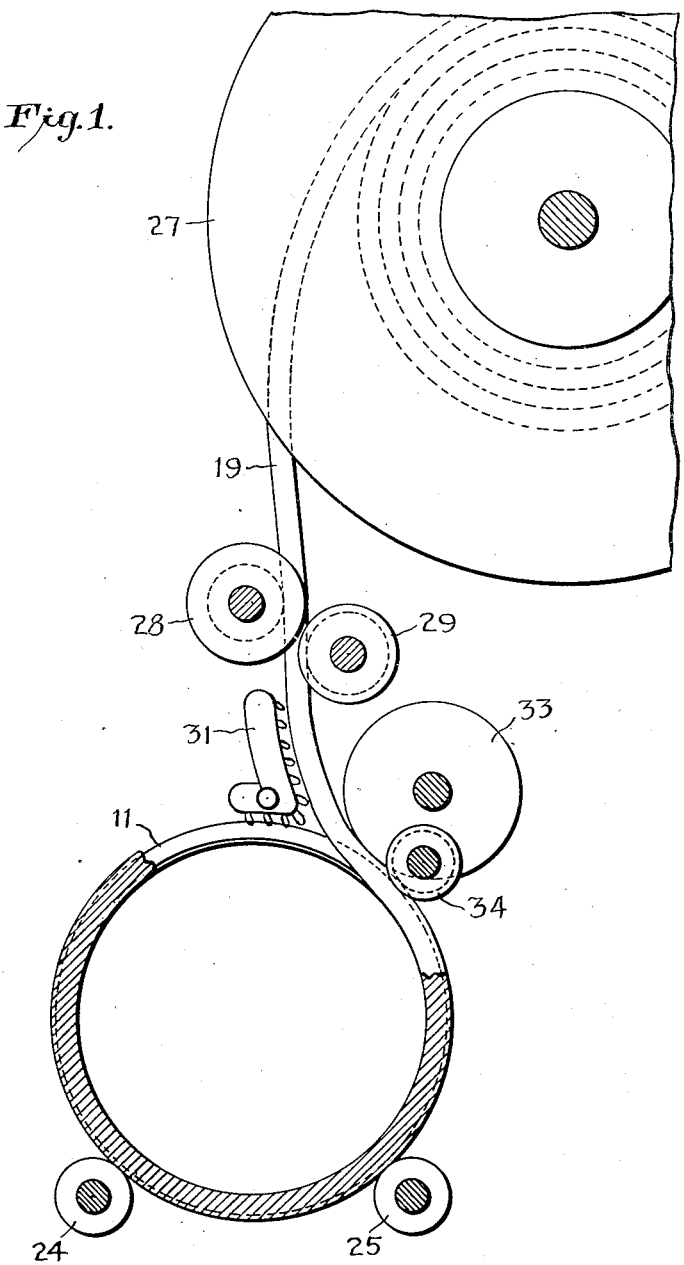

2,182,796

UNITED STATES PATENT OFFICE 2,182,796

WELDING PROCESS

George M. Deming, East Orange, N. J., assignor to Air Reduction Company, Incorporated, New York, N. Y., a corporation of New York Application January 20, 1936, Serial No. 59,811

7 Claims. (Cl. 113—112)

This invention relates to the butt-welding of plates, pipe or other parts of relatively thick section. Whereas comparatively thin parts may be united by melting together the edges without addition of metal, for the heavier sections it is customary to prepare the edges by so shaping them that they will form a trough, and to fill such trough with metal melted from a welding rod or electrode. In this way a fusion weld coextensive with the thickness of the parts, and with or without top reinforcement or projection, may be obtained. Simultaneously with the melting in of the filler metal it is customary to melt down the sides of the trough to insure homogeneous union of the parent and the added metal; in some instances, however, there may be little or no actual melting of parent metal, as when the faces of the trough or groove are brought to a sweating condition.

In any event the necessity of melting a large quantity of metal requires the expenditure of a large amount of heat energy, and the linear speed of welding is limited by the amount of energy practically available and the manner in which it is applied.

The object of this invention is to make deep welds much more economically or at much greater speeds, or both. The object is, also, to produce welds of superior strength. The method is one that employs flame heating, preferably by oxyacetylene flames, though in same applications of the invention flames of lower temperature may be utilized.

In the process of this invention a filler rod is used, but it is not melted away in the usual manner to fill the trough. Instead, the filler rod is progressively heated to bring its sides to a condition of surface fusion, while the sides of the trough are also progressively heated, whereupon the rod is progressively pressed into the groove. Since the successive portions of the surfaces of the filler rod and trough are heated and fused before each portion of the rod is introduced into the trough, there is opportunity to destroy surface oxide films and the like that would otherwise cause weakness, and to furnish sufficient molten metal to insure a true fusion bonding of the plate metal parts and the interposed filler, so that the weld is of high quality and sound. While the filler rod remains substantially intact, the advantages of the invention are most completely realized when the lateral surfaces of the filler rod are fused to such extent as to supply an excess of molten metal the better to obliterate irregularities of interfacial conditions and also to insure smooth bonding contours for the weld, in addition to which fluid metal dislodged by the welding flame or squeezed from the filler makes certain the filling of the bottom of the weld.

In accordance with one feature of the preferred mode of executing the invention, control is exercised of the heating of the filler rod and of the edge faces of the parts to be united, that is to say the sides of the trough, in such manner that there is material melting of the sides of the filler and a pronounced softening of its body, whereas the sides of the trough are melted but slightly and are so little softened that they resist deformation when the filler is pressed into place. Reasonably good welds may be obtained without actually bringing the sides of the trough to a condition of surface fusion. Conversely, the sides of the trough may be brought to surface fusion, while the surfaces of the filler rod are fused to little or no extent.

The welds contemplated by the invention are made most easily and satisfactory when the cross-section of the filler rod corresponds substantially to the shape of the trough between the plate metal parts. However, the plasticity imparted to the filler rod will enable it, under sufficient pressure, to conform to the trough though the shapes be different. Considerable advantage is realized if the plates are beveled to form a V trough and the filler has a like V section, relatively little pressure being then required to overcome minor differences in section and obtain complete and uniform bonding through the length and depth of the weld.

Other objects, features, aspects and advantages of the invention will be apparent to those skilled in the art from this specification and the drawings forming part hereof.

In the said drawings:

Fig. 1 is a schematic view illustrating the invention as applied to the production of a weld between the ends of two pipe sections. The view is partly in section and partly in elevation, the principal section being taken in a plane at right angles to the axis of the pipe and passing centrally through the open seam and the portion of the weld that has been made.

Fig. 2 is a section across the open seam and through the filler rod. The surfaces have not yet been fused and the portion of the rod is not yet in place in the trough. The view does not show the actual relation when referred to Fig. 1 but serves as a simple illustration.

Fig. 3 is a view similar to Fig. 2, showing that the surfaces have been fused and that a portion of the filler rod is about to be pressed to its final position. The rough lines for the bonding surfaces of the trough and of the filler rod indicate that these surfaces have been fused. It will be understood, however, that the surfaces of the trough may remain substantially smooth and have no more than a slight molten film.

Fig. 4 is another view of this series showing the completion of the weld. This view shows a presser roller and also side rollers which may be used to contour the margins of the top of the weld.

Fig. 5 is a view looking to the left in Fig. 1, illustrating more particularly the relation of a torch heating device to the open seam and to the filler rod.

The two metal parts 11, 12, to be united may be two sections of pipe between the ends of which a filled buttweld is to be made. Before the operation is commenced the pipe ends may be tack-welded together in the usual manner. The invention is equally applicable to the welding of plates either flat or curved, or to the welding of the longitudinal seam of pipe, or to welding other relatively thick parts or portions.

The juxtaposed edges of the parts 11 and 12 are prepared by so shaping them that when they are in position for welding they define a trough. The extreme lower edges are preferably spaced apart a short distance, leaving a slot-like opening in the bottom of the trough, as is the usual practice when a weld is to be made by filling the trough with deposited molten metal. The shape of the trough may vary, but it is more satisfactory for the purpose of this invention to provide a V trough as shown, this being accomplished by beveling the edges of the parts 11 and 12. At the bottom of the beveled faces 14 and 15 there may be short vertical faces 16 and 17 as in ordinary fusion welding practice.

The filler rod 19 is preferably pre-formed with a section corresponding to the section of the trough. In the preferred form of execution of the invention the section of the rod is substantially triangular, or wedge-shape. But since it is intended in most instances to heat the rod until its body is quite plastic before it is pressed into the trough or open seam, it is possible to utilize a rod of other section, not approximating the shape of the trough.

In the preferred form of the invention the surfaces of the filler rod to be heated and fused are the faces 21, 22 of an acute wedge form.

If the parts to be joined by welding are pipe lengths, they may be supported on bed rollers 24, 25 driven to rotate the pipe.

An indefinite length of the filler rod may be carried on a reel 27, to pass guide rollers 28 and 29 to the region of a multi-flame torch 31, and thence promptly to a presser roller 33, which may be driven or idle. Associated with the presser roller 33 there may be contouring rollers 34 to merge the lateral portions of the top of the weld with the outer surfaces of the parts 11, 12. The process is not dependent upon specific apparatus and could be carried out manually.

From the torch 31 flame jets are directed against the trough surfaces 14, 15 of the parent metal parts and the side surfaces 21, 22 of the filler rod at the region where the filler rod approaches the trough. It matters not whether both the parent metal parts and the filler rod are in motion, with the heating means stationary, or whether the parent metal parts are stationary and the filler rod is put into the groove while the torch moves along the trough.

The process gives best results when the flames heating the rod are sufficiently distributed lengthwise of the rod to enable the heat to soak in and soften the rod into its interior, whereas the flames to heat the sides of the trough are concentrated for quick heating of these surfaces without any material sub-surface softening. In the typical and preferred performance of the invention both the surfaces 21 and 22 of the rod and the surfaces 14 and 15 of the trough are brought to surface fusion, but if one set of surfaces is fused and the other set is sufficiently heated a weld sound enough for some purposes may be made.

An acute wedge formation of the filler rod and a corresponding shape of the trough, as illustrated, enables the weld to be made with the least amount of pressure applied by the roller 33 or by other suitable instrumentality.

In the case of the welding together of pipe ends or sections of cylindrical vessels, the torch 31 may be removed as the end of the weld is approached, the rotation of the pipe may be stopped, and the filler rod may be cut off, after which the final portion of the weld may be made with a hand torch. The welding of seams which are not endless, such as seams between plates, may be effected even more simply. Instead of using a filler rod supply of indefinite length, a filler rod previously cut to the approximate length of a seam may be employed.

While the invention contemplates more particularly the joining of ferrous metal parts with a ferrous metal filler rod, it is not strictly limited in this respect. The filler rod may be of a composition similar to the so-called bronze welding rods; also the sides of a ferrous filler rod may be thickly coated with a brazing metal or brazing composition, and also with flux, in which event lower temperature and cheaper gases may be used to produce a brazed union. These and like modifications will be understood to be comprehended by the terms "weld" and "welding" as used herein.

I claim:

1. The method of welding a seam comprising progressively heating the edge faces of the seam quickly to obtain a condition of surface fusion without softening the metal to any substantial depth below the surface, the heating not being carried to the point of producing a change in the cross-section of the trough, progressively heating a filler rod more slowly so that it is softened sufficiently to be easily deformed by the time its surface is brought to a condition of fusion, correlating the heating of the edge faces of the seam with the heating of the filler rod so that corresponding portions of both are brought to a condition of surface fusion at the same time, and while in such condition progressively pressing the filler rod into the seam to bring the fused surfaces together to make a weld.

2. The method of joining metal parts by welding juxtaposed faces of said metal parts to a continuous solid filler rod preformed to fit into and substantially fill the space between said faces, the welding being done by surface fusing the faces and filler rod by flame heating applied progressively along the length of their faces before they are associated, and immediately beyond the region of heating progressively pressing the solid filler rod into the space between the juxtaposed faces of the metal parts.

3. The method of uniting juxtaposed edge portions of relatively thick metal, which comprises progressively heating the edge faces of said portions without producing a flow of the metal of said faces and progressively heating a filler rod by flame heating while the edge faces and rod are spaced from one another and until the latter is softened internally and its side surfaces are melted, and immediately beyond the region of heating progressively inserting the filler rod between the edge faces and by rolling pressure on top of the filler completing each portion of the weld.

4. In the welding of the confronting edge faces of metal parts by fusing said edge faces to make a weld, the improvement which comprises progressively heating a filler rod having a cross-section which substantially fits the spaces between the confronting edge faces, heating each portion of the rod for a longer time than the corresponding portion of the groove and controlling the rate of said heating to cause the entire cross-section of the filler rod to absorb sufficient heat to become soft and substantially plastic by the time the surfaces of said rod reach a state of surface fusion, progressively heating the edge faces of the metal parts during the last part of the filler rod heating step, without producing substantial deformation of the edges of said parts, and in such timed relation with the heating of the filler rod that the surfaces at corresponding regions along the length of said rod and the edge faces of the metal parts reach a state of surface fusion at the same time, progressively pressing the filler rod into the space between the confronting edge faces, and rolling the upper surface of the rod to force said rod firmly into position and cause an intimate contact of the fused areas.

5. The method of joining metal parts by welding them to a solid joining piece having a cross-section substantially formed to fit the space between converging faces of said metal parts, which method comprises heating confronting faces of the parts to be joined progressively along their length of direct flame heating, heating faces of the joining piece by direct flame heating simultaneously with the heating of said confronting faces and progressively along its length at a rate which brings the faces of the joining piece to a welding condition without any substantial melting of said joining piece, correlating the heating of said confronting faces and said joining piece so that they reach a welding condition progressively at corresponding regions along their length at substantially the same, and then progressively inserting the solid joining piece into the space between the confronting faces and into intimate contact with said faces to weld the metal parts to said joining piece.

6. The method of connecting metal parts which have their edge faces beveled to form a trough of decreasing width toward the bottom, which method comprises heating the sloping faces of the metal parts to a state of surface fusion progressively along the length of the seam by gas flames applied directly to said sloping faces, the heating not being carried to the point of producing a change in the cross section of the trough, simultaneously heating by flames to a welding condition the complementary faces of a filler rod preformed to fit and substantially fill the trough, and without melting the body of the rod progressively pressing said filler rod into the trough to bring the opposing faces of the rod and metal parts into intimate contact immediately after said heating.

7. In the uniting of metal parts, the juxtaposed edges of which are of such shape as to form a trough, by heating the edges progressively along their length and adding a filler rod to fill the trough, the improvement which comprises by flame heating the sides of the trough until said sides reach a condition of surface fusion, the heating not being carried to the point of producing a change in the cross section of the trough, and by flame heating progressively heating a filler rod that is formed to fit the trough, and causing said heating to proceed at a rapid rate which produces a surface fusion of the rod without melting the body of the rod, and after said rod reaches a state of surface fusion progressively pressing the rod into the trough immediately beyond the region of heating.

GEORGE M. DEMING.